United States Patent
Lobo et al.

(10) Patent No.: US 9,305,029 B1
(45) Date of Patent: Apr. 5, 2016

(54) INVENTORY CENTRIC KNOWLEDGE MANAGEMENT

(75) Inventors: Shane A. Lobo, Orlando, FL (US); Brian D. Lushear, Winter Springs, FL (US); Todd Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 607 days.

(21) Appl. No.: 13/304,410

(22) Filed: Nov. 25, 2011

(51) Int. Cl.
*G06F 17/30* (2006.01)

(52) U.S. Cl.
CPC .... *G06F 17/30286* (2013.01); *G06F 17/30321* (2013.01)

(58) Field of Classification Search
None
See application file for complete search history.

(56) References Cited

U.S. PATENT DOCUMENTS

| | | | |
|---|---|---|---|
| 5,825,775 A | 10/1998 | Chin et al. | |
| 5,898,826 A | 4/1999 | Pierce et al. | |
| 5,982,753 A * | 11/1999 | Pendleton | H04L 12/2697 370/252 |
| 6,046,988 A | 4/2000 | Schenkel et al. | |
| 6,226,265 B1 | 5/2001 | Nakamichi et al. | |
| 6,393,483 B1 | 5/2002 | Latif et al. | |
| 6,570,867 B1 | 5/2003 | Robinson et al. | |
| 6,650,347 B1 | 11/2003 | Nulu et al. | |
| 6,700,967 B2 | 3/2004 | Kleinöder et al. | |
| 6,788,697 B1 | 9/2004 | Aweya et al. | |
| 6,792,273 B1 | 9/2004 | Tellinger et al. | |
| 6,813,634 B1 | 11/2004 | Ahmed | |
| 6,963,575 B1 | 11/2005 | Sistanizadeh et al. | |
| 6,973,042 B1 | 12/2005 | Fitzgerald | |
| 6,978,223 B2 | 12/2005 | Milliken | |
| 7,016,301 B1 | 3/2006 | Moore | |
| 7,099,305 B1 | 8/2006 | Fardid | |
| 7,099,912 B2 | 8/2006 | Ishizaki et al. | |
| 7,110,362 B2 | 9/2006 | Kato | |
| 7,143,152 B1 | 11/2006 | Elman | |
| 7,213,021 B2 | 5/2007 | Taguchi et al. | |
| 7,225,139 B1 | 5/2007 | Tidwell et al. | |
| 7,376,719 B1 | 5/2008 | Shafer et al. | |
| 7,376,864 B1 | 5/2008 | Hu et al. | |
| 7,424,526 B1 | 9/2008 | Hansen et al. | |
| 7,464,152 B2 | 12/2008 | Ishizaki et al. | |
| 7,467,225 B2 | 12/2008 | Anerousis et al. | |
| 7,751,392 B1 | 7/2010 | Gonzalez et al. | |

(Continued)

OTHER PUBLICATIONS

Office Action dated Mar. 2, 2009, U.S. Appl. No. 11/551,704, filed Oct. 21, 2006.

(Continued)

*Primary Examiner* — Son T Hoang

(57) ABSTRACT

A method of managing data communication network inventory is provided. The method comprises analyzing a plurality of separate data stores, the data stores comprising information about trouble tickets, change requests, and scheduled maintenance, where the analysis is conducted with reference to network inventory items. An integrated data store structured according to network inventory items is built, comprising trouble ticket information, change request information, and scheduled maintenance associated with the network inventory items, where the network inventory items comprise one or more port interfaces. A selection of a network inventory item is received. Filtered information is retrieved from the integrated data store summarizing the trouble ticket information, the change request information, and the scheduled maintenance related to the selected network inventory item. The filtered information is transmitted.

20 Claims, 5 Drawing Sheets

(56) References Cited

U.S. PATENT DOCUMENTS

| | | |
|---|---|---|
| 7,830,816 B1 | 11/2010 | Gonzalez et al. |
| 7,831,709 B1 | 11/2010 | Ham et al. |
| 7,869,432 B1 | 1/2011 | Mollyn |
| 7,904,533 B1 | 3/2011 | Gonzalez et al. |
| 7,904,553 B1 | 3/2011 | Ham et al. |
| 7,917,854 B1 | 3/2011 | Beaudoin et al. |
| 7,940,676 B2 | 5/2011 | Griffin |
| 7,983,174 B1 | 7/2011 | Monaghan et al. |
| 8,139,475 B2 | 3/2012 | Vercellone et al. |
| 8,289,878 B1 | 10/2012 | Gonzalez et al. |
| 8,301,762 B1 | 10/2012 | Lobo et al. |
| 8,355,316 B1 | 1/2013 | Lushear et al. |
| 8,458,323 B1 | 6/2013 | Baader, II et al. |
| 8,644,146 B1 | 2/2014 | Kurtz et al. |
| 2002/0022985 A1 | 2/2002 | Guidice et al. |
| 2002/0078232 A1 | 6/2002 | Simpson et al. |
| 2002/0087393 A1 | 7/2002 | Philonenko |
| 2002/0101821 A1 | 8/2002 | Feldmann et al. |
| 2002/0103631 A1 | 8/2002 | Feldmann et al. |
| 2002/0103921 A1 | 8/2002 | Nair et al. |
| 2002/0164007 A1 | 11/2002 | Henits |
| 2002/0172148 A1 | 11/2002 | Kim et al. |
| 2002/0181047 A1 | 12/2002 | Lauder et al. |
| 2002/0186259 A1 | 12/2002 | Meandzija et al. |
| 2003/0051195 A1 | 3/2003 | Bosa et al. |
| 2003/0055972 A1 | 3/2003 | Fuller et al. |
| 2003/0145072 A1 | 7/2003 | Lau et al. |
| 2003/0152067 A1 | 8/2003 | Richmond et al. |
| 2003/0154404 A1 | 8/2003 | Beadles et al. |
| 2004/0006618 A1 | 1/2004 | Kasai et al. |
| 2004/0010496 A1 | 1/2004 | Behrendt et al. |
| 2004/0031059 A1 | 2/2004 | Bialk et al. |
| 2004/0059781 A1 | 3/2004 | Yoakum et al. |
| 2004/0064581 A1 | 4/2004 | Shitama et al. |
| 2004/0071164 A1 | 4/2004 | Baum |
| 2004/0139193 A1 | 7/2004 | Refai et al. |
| 2004/0210621 A1 | 10/2004 | Antonellis |
| 2004/0264484 A1 | 12/2004 | Kui et al. |
| 2005/0022189 A1 | 1/2005 | Proulx et al. |
| 2005/0027845 A1 | 2/2005 | Secor et al. |
| 2005/0091482 A1 | 4/2005 | Gray et al. |
| 2005/0094653 A1 | 5/2005 | Milburn et al. |
| 2005/0240835 A1 | 10/2005 | Dragnea et al. |
| 2006/0002401 A1 | 1/2006 | Mukherjee et al. |
| 2006/0031077 A1* | 2/2006 | Dalton et al. ............... 705/1 |
| 2006/0067237 A1* | 3/2006 | Burns et al. ............... 370/241 |
| 2006/0146694 A1 | 7/2006 | Hamaguchi et al. |
| 2006/0167703 A1 | 7/2006 | Yakov |
| 2006/0187855 A1 | 8/2006 | Booth, III et al. |
| 2006/0215577 A1 | 9/2006 | Guichard et al. |
| 2006/0268740 A1 | 11/2006 | Rosenberg et al. |
| 2006/0287593 A1 | 12/2006 | Jaggu et al. |
| 2007/0041554 A1 | 2/2007 | Newman et al. |
| 2007/0050497 A1 | 3/2007 | Haley et al. |
| 2007/0053368 A1 | 3/2007 | Chang et al. |
| 2007/0250625 A1 | 10/2007 | Titus |
| 2007/0274285 A1 | 11/2007 | Werber et al. |
| 2007/0280241 A1 | 12/2007 | Verma |
| 2008/0002975 A1 | 1/2008 | Vukovic et al. |
| 2008/0052539 A1 | 2/2008 | MacMillan et al. |
| 2008/0313491 A1* | 12/2008 | Adams et al. ............... 714/4 |
| 2008/0317039 A1 | 12/2008 | Satterlee et al. |
| 2009/0006112 A1* | 1/2009 | White et al. ............... 705/1 |
| 2009/0067324 A1 | 3/2009 | Licardie et al. |
| 2009/0198832 A1 | 8/2009 | Shah et al. |
| 2009/0201911 A1 | 8/2009 | DuPertuis et al. |
| 2009/0222547 A1 | 9/2009 | Boylan et al. |
| 2009/0234946 A1* | 9/2009 | Luo et al. ............... 709/224 |
| 2009/0296588 A1 | 12/2009 | Nishi et al. |
| 2010/0153537 A1 | 6/2010 | Wang et al. |
| 2010/0195489 A1 | 8/2010 | Zhou et al. |
| 2011/0004885 A1 | 1/2011 | Kikuchi et al. |
| 2011/0013643 A1 | 1/2011 | Yang et al. |

OTHER PUBLICATIONS

Final Office Action dated Aug. 13, 2009, U.S. Appl. No. 11/551,704, filed Oct. 21, 2006.
Office Action (Advisory Action) dated Oct. 16, 2009, U.S. Appl. No. 11/551,704, filed Oct. 21, 2006.
Office Action dated Dec. 31, 2009, U.S. Appl. No. 11/551,704, filed Oct. 21, 2006.
Office Action dated May 20, 2010, U.S. Appl. No. 11/551,704, filed Oct. 21, 2006.
Notice of Allowance dated Oct. 28, 2010, U.S. Appl. No. 11/551,704, filed Oct. 21, 2006.
Supplemental Notice of Allowance dated Dec. 8, 2010, U.S. Appl. No. 11/551,704, filed Oct. 21, 2006.
Office Action dated Jun. 15, 2009, U.S. Appl. No. 11/620,140, filed Jan. 5, 2007.
Final Office Action dated Nov. 27, 2009, U.S. Appl. No. 11/620,140, filed Jan. 5, 2007.
Advisory Action dated Feb. 17, 2010, U.S. Appl. No. 11/620,140, filed Jan. 5, 2007.
Notice of Allowance dated Mar. 22, 2010, U.S. Appl. No. 11/620,140, filed Jan. 5, 2007.
Office Action dated May 25, 2010, U.S. Appl. No. 11/746,273, filed May 9, 2007.
Final Office Action dated Nov. 19, 2010, U.S. Appl. No. 11/746,273, filed May 9, 2007.
Advisory Action dated Feb. 10, 2011, U.S. Appl. No. 11/746,273, filed May 9, 2007.
Office Action dated Mar. 31, 2011, U.S. Appl. No. 11/746,273, filed May 9, 2007.
Office Action dated Nov. 1, 2011, U.S. Appl. No. 11/746,273, filed May 9, 2007.
Notice of Allowance dated Jun. 8, 2012, U.S. Appl. No. 11/746,273, filed May 9, 2007.
Office Action dated Apr. 3, 2009, U.S. Appl. No. 11/838,175, filed Aug. 13, 2007.
Final Office Action dated Nov. 24, 2009, U.S. Appl. No. 11/838,175, filed Aug. 13, 2007.
Advisory Action dated Mar. 24, 2010, U.S. Appl. No. 11/838,175, filed Aug. 13, 2007.
Notice of Allowance dated Aug. 2, 2010, U.S. Appl. No. 11/838,175, filed Aug. 13, 2007.
Office Action—First Action Interview Pilot Program Pre-Interview Communication dated Apr. 2, 2010, U.S. Appl. No. 12/036,289, filed Feb. 24, 2008.
Notice of Allowance dated Jul. 26, 2010, U.S. Appl. No. 12/036,289, filed Feb. 24, 2008.
Notice of Allowance dated Oct. 15, 2010, U.S. Appl. No. 12/273,537, filed Nov. 18, 2008.
Supplemental Notice of Allowance dated Nov. 12, 2010, U.S. Appl. No. 12/273,537, filed Nov. 18, 2008.
Supplemental Notice of Allowance dated Jan. 10, 2011, U.S. Appl. No. 12/273,537, filed Nov. 18, 2008.
Office Action dated Jun. 9, 2011, U.S. Appl. No. 121480,681, filed Jun. 8, 2009.
Final Office Action dated Nov. 9, 2011, U.S. Appl. No. 12/480,681, filed Jun. 8, 2009.
Advisory Action dated Jan. 23, 2012, U.S. Appl. No. 12/480,681, filed Jun. 8, 2009.
Notice of Allowance dated Mar. 5, 2012, U.S. Appl. No. 12/480,681, filed Jun. 8, 2009.
Pre-Interview Communication dated Jun. 29, 2012, U.S. Appl. No. 12/546,351, filed Aug. 24, 2009.
FAIPP Office Action dated Aug. 28, 2012, U.S. Appl. No. 12/546,351, filed Aug. 24, 2009.
Notice of Allowance dated Jan. 31, 2013, U.S. Appl. No. 12/546,351, filed Aug. 24, 2009.
Pre-Interview Communication dated Jun. 15, 2012, U.S. Appl. No. 12/639,906, filed Dec. 16, 2009.

(56) References Cited

OTHER PUBLICATIONS

Office Action—FAIPP dated Jul. 26, 2012, U.S. Appl. No. 12/639,906, filed Dec. 16, 2009.
Notice of Allowance dated Sep. 13, 2012, U.S. Appl. No. 12/639,906, filed Dec. 16, 2009.
Pre-Interview Communication dated Mar. 27, 2013, U.S. Appl. No. 12/848,818, filed Aug. 2, 2010.
FAIPP Office Action dated Jun. 17, 2013, U.S. Appl. No. 12/848,818, filed Aug. 2, 2010.
Notice of Allowance dated Sep. 20, 2013, U.S. Appl. No. 12/848,818, filed Aug. 2, 2010.
"traceroute", Wikipedia, http://en.wikipedia.org/w/index.php?title=Traceroute&printable=yes, Oct. 19, 2009, pp. 1-4, Wikipedia.org.

\* cited by examiner

INVENTORY CENTRIC KNOWLEDGE MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise or business may subscribe to a variety of communication services provided by one or more service providers who operate owned or leased telecommunications equipment. The subscriber may be provided access to the public communications network by a local exchange carrier (LEC) which provides one or more dedicated lines to each subscriber from a switch. The traffic from multiple subscribers may be switched by the LEC to share a common resource according to statistical multiplexing techniques or some other process. Alternatively, a subscriber may be allocated a dedicated line, for example a T-1 resource, on a continuous basis rather than a switched basis.

The subscriber may obtain connectivity to the Internet by subscribing to an Internet service provided by an Internet service provider (ISP). The ISP may provide this Internet service with a port on a router operated by the ISP. The port on the router may be dedicated or reserved primarily or completely for the use of the subscriber. The subscriber connectivity to the Internet may be provided by a first communication link from the subscriber to the LEC switch and by a second communication link from the LEC switch to the port on the router. Alternatively, the subscriber connectivity to the Internet may be provided directly or indirectly by a single communication link from the subscriber to the port on the router. A router is an electronic device that provides connectivity between two networks and typically supports routing of data packets to other network nodes based on addresses embedded in the header of the data packets.

The communication services may be defined, at least in part, by a service level agreement (SLA) that may define a class of service, a bandwidth, and other key communication parameters. An SLA may also define service availability, time to identify the cause of a customer affecting malfunction, time to repair a customer affecting malfunction, service provisioning time, and other. A quality of service (QoS) and/or a class of service associated with the communication service may be implied by the SLA.

SUMMARY

In an embodiment, a method of managing data communication network inventory is disclosed. The method comprises analyzing a plurality of separate data stores, the data stores comprising information about trouble tickets, change requests, and scheduled maintenance, where the analysis is conducted with reference to network inventory items. An integrated data store structured according to network inventory items is built, comprising trouble ticket information, change request information, and scheduled maintenance associated with the network inventory items, where the network inventory items comprise one or more port interfaces. A selection of a network inventory item is received. Filtered information is retrieved from the integrated data store summarizing the trouble ticket information, the change request information, and the scheduled maintenance related to the selected network inventory item. The filtered information is transmitted.

In an embodiment, a method of managing data communication network inventory is disclosed. The method comprises analyzing a plurality of separate data stores, the data stores comprising information about trouble tickets, change requests, scheduled maintenance, current status information, and as-built network configuration information, where the analysis is conducted with reference to network inventory items. An integrated data store structured according to network inventory items is built, comprising trouble ticket information, change request information, scheduled maintenance, current status information, and as-built network configuration information associated with the network inventory items, where the network inventory items comprise one or more port interfaces. A selection of a network inventory item is received. Filtered information is retrieved from the integrated data store summarizing the trouble ticket information, the change request information, the scheduled maintenance, the current status, and the as-built network configuration related to the selected network inventory item. The filtered information is transmitted.

In an embodiment, a method of managing data communication network inventory is disclosed. The method comprises analyzing a plurality of separate data stores, the data stores comprising information about trouble tickets, change requests, and scheduled maintenance, where the analysis is conducted with reference to network inventory items. An integrated data store structured according to network inventory items is built, comprising trouble ticket information, change request information, and scheduled maintenance associated with they network inventory items, where the network inventory items comprise one or more port interfaces. A selection of network inventory is received. Filtered information is retrieved from the integrated data store summarizing the trouble ticket information, the change request information, and the scheduled maintenance related to the selected network inventory item. The filtered information is transmitted. A selection of at least one test and a network inventory item is received. A test of the selected network inventory item is executed. A communication quality is determined based on a result of the test and an indication of the communication quality is transmitted.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
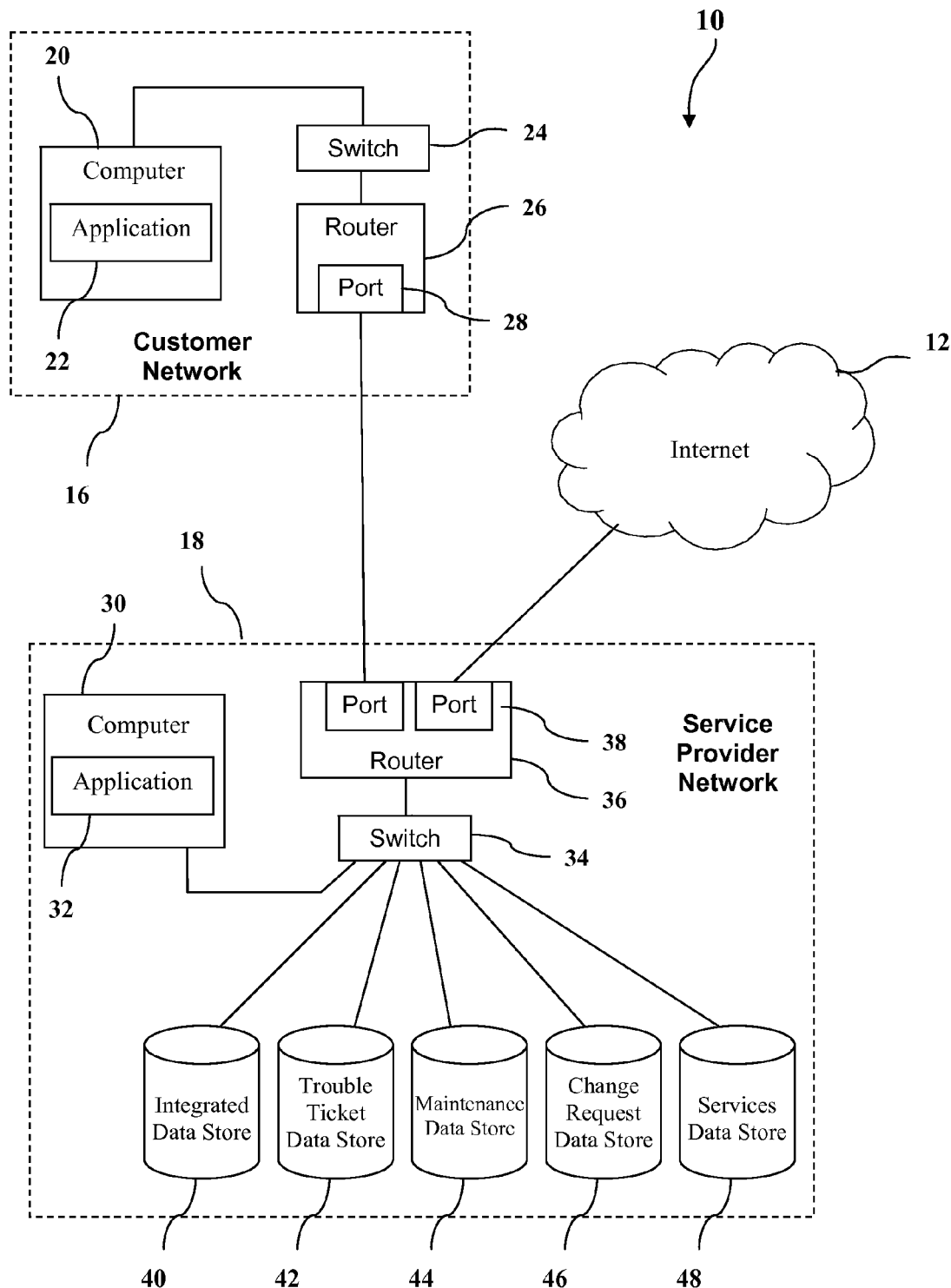
FIG. 1 is a block diagram of a data communication network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Data communications network inventory status information may be stored across a plurality of disparate databases. Separate data stores may be used for trouble tickets, scheduled maintenance, change requests, and subscribed services. To provide a streamlined view into the status of network inventory items such as port interfaces delivering network bandwidth to customers, the data across the plurality of data stores is analyzed with reference to the network inventory items and an integrated data store is created structured according to network port interfaces. In addition, current status and network configuration information is analyzed and included in the integrated data store.

The integrated data store is used to provide data to both a customer interface and an internal interface accessible to the network service provider with respect to network ports. The data can be presented differently for each interface, and the data presented to the customer interface may be a subset of the data presented to the internal interface. When a customer views their inventory, the customer portal may show a notification icon which allows them to quickly determine if there are any current active issues with their service. The icons will be present while an event or action associated with a port are active and for 48 hours after they are closed. There are different icons to represent various types of events that may occur. Selecting an icon presents more detailed information about the event. Similarly, the internal portal presents port notifications to provide employees with enriched information when viewing customer information, which may help the employee determine procedures to follow when handling a customer request. The notifications may be different than those presented in the customer portal, and additional notification types may be presented in the internal interface, such as if the customer has purchased premium services or the port is flagged with a special regulatory class of service.

In addition to presenting network inventory data from the integrated data store, when a network inventory item is selected a test of the item may be executed. Based on the result of the test a communication quality is determined and an indication of the communication quality is presented through the interface. The test may be automatically executed when a network inventory item is selected or it may manually be executed from the interface. For further details about the test system, see U.S. Pat. No. 7,830,816 issued Nov. 9, 2010, and entitled "Network Access and Quality of Service Troubleshooting," by Jose A. Gonzalez, et al., which is hereby incorporated by reference in its entirety.

Turning now to FIG. 1, a data communication network 10 is described. In an embodiment, the data communication network 10 comprises a public internet 12, a customer data network 16, and a service provider network 18. The service provider network 18 comprises a computer 30 which is coupled to the service provider network 18 through a switch 34. The computer 30 comprises an application 32 which may be used to access an internal interface to view information related to customer port inventory. The switch 34 is coupled to a router 36, an integrated data store 40, a trouble ticket data store 42, a maintenance data store 44, a change request data store 46, and a services data store 48. The router 36 comprises a plurality of ports 38 which provide data bandwidth and connectivity to the public internet 12 to customer data networks 16.

It is understood that the data communication network 10 may comprise many more nodes than those depicted in FIG. 1. For example, the data communication network 10 may comprise any number of customer data networks 16, any number of routers 36, any number of ports 38, and any number of switches 34. It is explicitly understood that the service provider network 18 may provide service to a plurality of customer data networks 16. Additionally, while the several data stores 40, 42, 44, 46, and 48, the switch 34, the router 36, and the computer 30 are shown to be located within the service provider network 18 and outside of the public internet 12, it is understood that some of these may be considered to exist in the network cloud of the public internet 12 and or coupled to one another via the network cloud of the public internet 12. For example, the switch 34 and the router 36 may be considered, according to one abstraction of the data communication network 10, to be part of the public internet 12. For example, the switch 34 may couple to one or more of the data stores 40, 42, 44, 46, and 48 via the network cloud of the public internet 12.

The integrated data store 40 is used to provide data to both a customer interface and an internal interface accessible to the network service provider with respect to network ports, for example ports 38. The trouble ticket data store 42, the maintenance data store 44, the change request data store 46, and the services data store 48 comprise information about trouble tickets, change requests, scheduled maintenance, and premium services associated with the network inventory items, respectively. The integrated data store 40 structured according to network inventory items is built by analyzing the trouble ticket data store 42, the maintenance data store 44, the change request data store 46, and the services data store 48, where the analysis is conducted with reference to network inventory items.

In an embodiment, the customer data network 16 may comprise a computer 20 which is coupled to the customer data network through a switch 24. The computer 20 executes an application 22 which may be used to access information about the customer's network inventory items from the integrated data store 40 on the service provider network 18. The switch 24 is coupled to a router 26 and provides network connectivity to the public network 12 via the service provider network 18 to connected devices in the customer data network 16. The router 26 comprises one or more ports 28, which when connected to a port on the service provider data network 18 provide connectivity to the public internet 12. The customer data network 16 may comprise any number of routers 26, switches 24, and computers 20.

Figure 2:
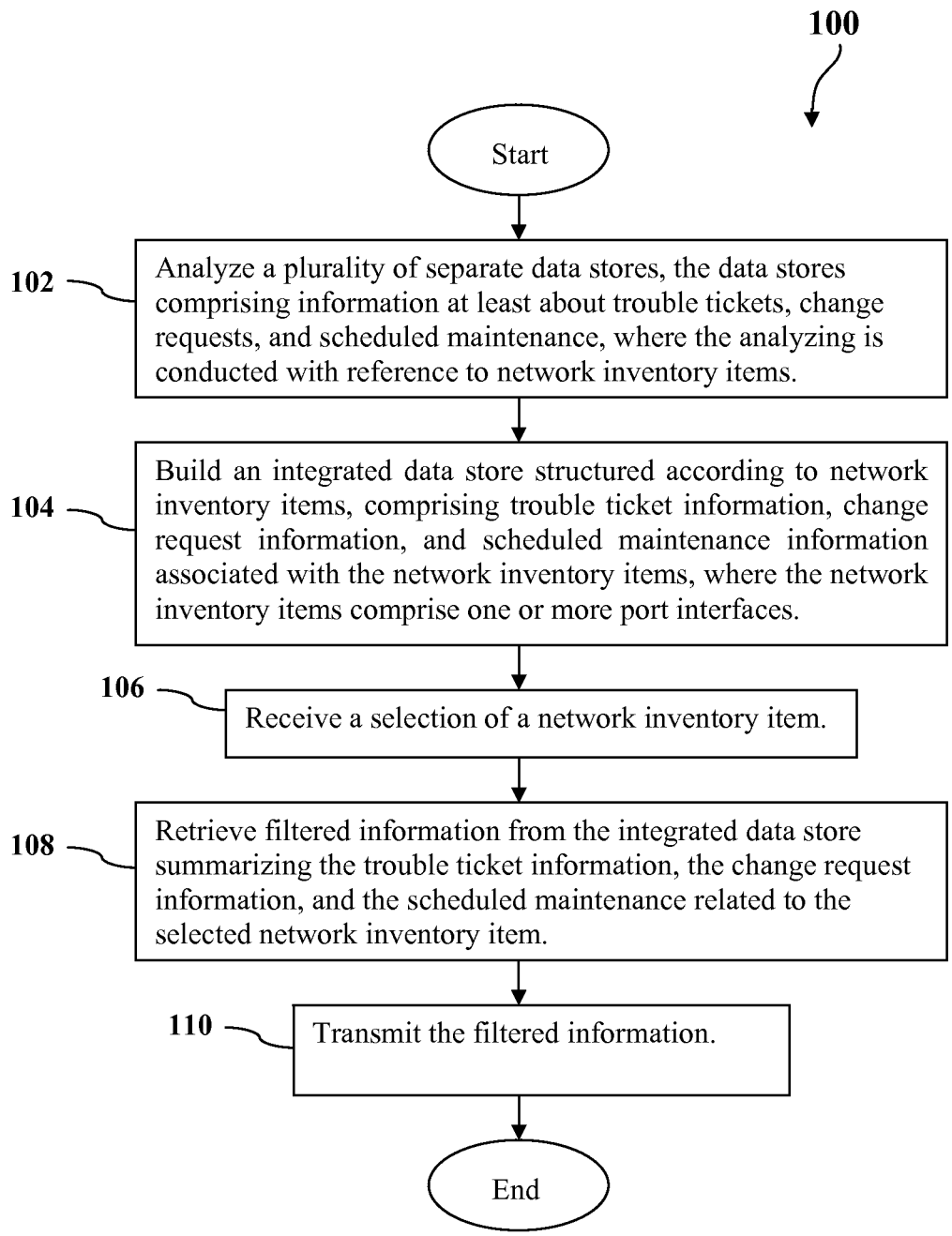
FIG. 2 is a flow chart of a method of managing data communication network inventory according to an embodiment of the disclosure.

Turning now to FIG. 2, a method 100 of managing data communication network inventory is described. At block 102, a plurality of separate data stores is analyzed, the data stores comprising information about trouble tickets, change requests, and scheduled maintenance, where the analysis is conducted with reference to network inventory items. Network inventory items may comprise one or more port interfaces delivering data bandwidth to customers. The data stores separately contain the information about the status and history of the network inventory items with regards to support and maintenance. At block 104, an integrated data store 40 structured according to network inventory items is built, comprising trouble ticket information association with the network inventory items, change request information association with the network inventory items, and scheduled maintenance associated with the network inventory items, where the network inventory items comprise one or more port interfaces. The information retrieved from the separate data stores is combined into the integrated data store 40 structured according to network port interfaces.

At block 106, a selection of a network inventory item is received. The selection of a network inventory item may be received from a customer or a network technician while viewing customer inventory through a web browser or application interfacing with the integrated data store 40 via an internal or external interface. The selection generates a request for filtered information from the integrated data store 40 about the selected port interface. In this context, filtering means selecting information from the integrated data store 40 that is related to the selected network inventory item. For example, a query may be formulated to search the integrated data store 40 according to a selection criteria embedded in the query that identifies the subject network inventory item. At block 108, filtered information is retrieved from the integrated data store 40 summarizing the trouble ticket information, the change request information, and the scheduled maintenance related to the selected network inventory item. Based on the port selection, a routine may run which retrieves associated information from the integrated data store 40 which summarizes the current port status. At block 110, the filtered information is transmitted. The filtered information is delivered to the client application which made the port interface selection.

In an embodiment, the integrated data store 40 further comprises managed services information associated with the network inventory items. Managed services are provided by the network service provider, who is responsible for providing a defined set of ongoing services and managing network inventory items for the customer. For example, in addition to providing connectivity and bandwidth to the customer, the network service provider may also be contracted to perform additional services related to the ongoing management of the customer's network inventory such as network monitoring, performance and security services. Ordering these managed services from the network service provider may free the customer from retaining internal resources and allow them to focus on their core business. Visibility for network inventory items with managed services may be provided based on the information in the integrated data store 40.

In an embodiment, the integrated data store 40 further comprises an indication of network inventory items managed by a third party vendor. The network service provider may outsource some managed services to a third party vendor. Providing an indication of network inventory items managed by a third party vendor gives the technical support personnel information that may assist them in escalating an issue and getting it in the hands of the appropriate vendor. For example, a customer may call in to report a problem with their internet connectivity. The technical support representative for the network service provider accesses the data for the customer's network inventory items from the integrated data store 40 and receives an indication that not only does the customer have managed services on their network inventory, but also an additional indication that management of the customer's network inventory has been outsourced to a third party vendor. Rather than assigning the trouble ticket to an internal resource, the technical support representative can take the steps needed to contact the third party vendor and notify them of the issue. Without the indication provided by the data from the integrated data store 40, the ticket may have been assigned internally until the services data store 48 was accessed, identifying the managed services by the third party vendor.

Alternatively, continuing the above customer care call scenario, the technical support representative may receive an indication that the problem reported by the specific customer is a known issue and related to scheduled maintenance of one or more ports 38 supporting the customer's internet connectivity. Thus, rather than creating a new trouble ticket and assigning customer care resources to further track down the cause of the problem, the customer may be provided with an estimated time for restoration of his or her internet connectivity and a reassuring explanation that the experienced trouble is not due to some unexpected failure in the internet service but instead is part of regularly scheduled maintenance. Additionally, this may contribute to maintaining positive customer attitudes towards the network service provider.

In an embodiment, the integrated data store 40 comprises premium services information associated with the network inventory items. Premium services may include large customers with their own network operations center who pay to have a direct support interface into the network operations center of the network service provider, or customers with previous issues whose accounts may need more sensitive treatment from technical support. By including this premium services information in the integrated data store 40, the technical support representatives will be able to see how a particular issue may need to be handled based on the summarized information provided when a network inventory item is viewed.

In an embodiment, the integrated data store 40 further comprises telecommunications service priority (TSP) codes information associated with the network inventory items. Telecommunications service priority is a program that authorizes national security and emergency organizations to receive priority treatment for vital telecommunications services. Telecommunications service priority identifies services critical for emergency preparedness to ensure network inventory items assigned with this service receive priority attention for provisioning or restoration.

In an embodiment, retrieving the filtered information from the integrated data store 40 is based on whether the selection of the network inventory item is received via an internal interface or via an external customer portal, and the filtered information retrieved differs between the internal interface and the external customer portal. The integrated data store 40 is accessed to supply information for both internal applications and the external customer portal. Some information in the integrated data store 40 may be internal information which is considered confidential, and this information would not be presented to the external customer portal. Additionally, there may be information beneficial to technical support representatives in troubleshooting issues which may only be presented through the internal interface.

In an embodiment, the filtered information retrieved from the integrated data store 40 for the external customer portal is a subset of the filtered information retrieved for the internal interface. While the internal interface may provide access to the complete information for a network inventory item from the integrated data store 40, only a subset of the data may be allowed for retrieval over the external customer interface. In addition to presenting information in a customer focused manner through the external customer interface, some proprietary information may be restricted to the internal interface. In an embodiment, the network inventory items available in the external customer portal are based on a grouping of ports assigned to a customer login. The external customer portal will limit the network inventory items which are visible to the customer. The grouping of ports that belong to the customer account will be assigned to the customer login on the external customer portal and will be presented to the customer upon login.

Figure 3:
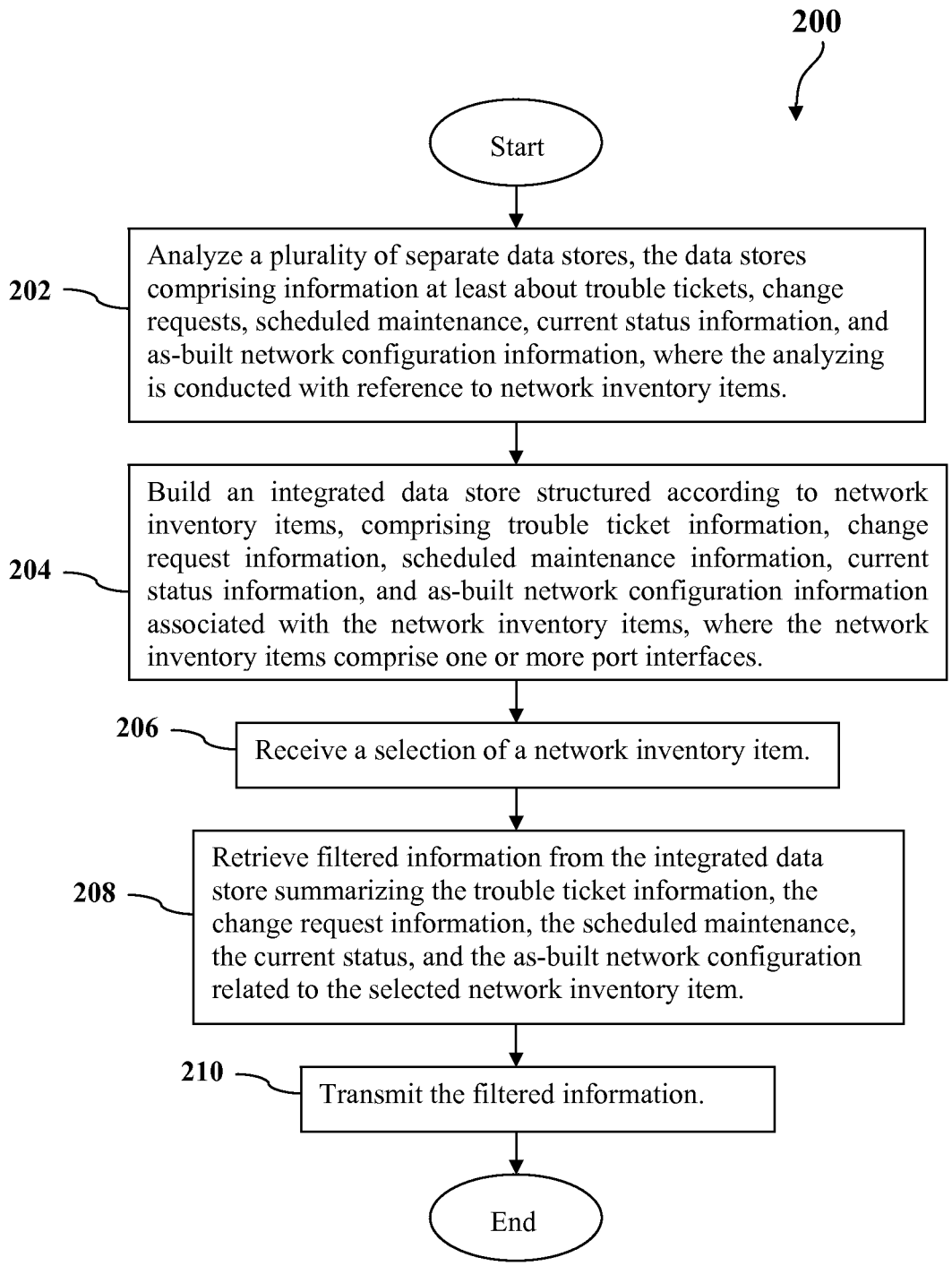
FIG. 3 is a flow chart of a method managing data communication network inventory according to an embodiment of the disclosure.

Turning now to FIG. 3, a method 200 of managing data communication network inventory is described. At block 202, a plurality of separate data stores is analyzed, the data stores comprising information about trouble tickets, change requests, scheduled maintenance, current status information, and as-built network configuration information, where the analysis is conducted with reference to network inventory items. The data from each data store is analyzed. Without the benefit of keys to relate the data between each data store, logic in the software is used to analyze the data with reference to network inventory items. For example, a trouble ticket in the trouble ticket data store 42 may contain a ticket number, a customer name and a network inventory port number, while an entry for scheduled maintenance in the maintenance data store 44 may contain a router name, a customer identification number and a scheduled time for the maintenance event. The analysis with reference to network inventory items uses software logic to associate the data in the different data stores, such as the router name in the maintenance data store 44 and network inventory port number in the trouble ticket data store 42, to understand relationships between data in different data stores with different identifiers and field names.

At block 204, an integrated data store 40 structured according to network inventory items is built, comprising trouble ticket information associated with the network inventory items, change request information associated with the network inventory items, scheduled maintenance associated with the network inventory items, current status information associated with the network inventory items, and as-built network configuration associated with the network inventory items, where the network inventory items comprise one or more port interfaces. The analyzed data from the separate data stores is used to build an integrated data store 40 specifically structured according to network port interfaces. At block 206, a selection of a network inventory item is received. A customer or technical support representative selects a network inventory item to view the information relative to the port interface. At block 208, filtered information is retrieved from the integrated data store 40 summarizing the trouble ticket information, the change request information, the scheduled maintenance, the current status, and the as-built network configuration related to the selected network inventory item. The information is filtered according to the selected port interface and is retrieved from the integrated data store 40 and includes the information that previously was in separate data stores. At block 210, the filtered information is transmitted. The information about the selected port interface may be sent to the customer or technical support representative.

In an embodiment, the scheduled maintenance associated with the network inventory items comprise customer specific, site specific, and port specific outage and maintenance information. Network inventory items may be presented differently to the network service provider as opposed to the external customer. Through the internal interface the service provider may have visibility to scheduled maintenance events at a hardware level, for example maintenance of a router or a card or module on the router. Separate ports on the router may be assigned to a plurality of customers, presenting the need to view the maintenance information with more granularity. The integrated data store 40 will also present this maintenance information on a customer level, site level, and port level basis to better represent customer impacts of the maintenance. The external customer would not have visibility to the hardware level, but would instead be able to see maintenance impacts specific to network inventory items assigned to their accounts.

In an embodiment, analyzing the plurality of separate data stores consists of associating at least one identifier in one data store with a different identifier in another data store. The separate data stores are independent of each other and as such may not contain matching keys that assist in relating the data between the data stores. Therefore programming logic is used in analyzing the data stores and identifying common data fields that can be used to correlate the data across the data stores.

In an embodiment, the integrated data store 40 is periodically updated with new data retrieved from the plurality of separate data stores. As each of the separate data stores receives new data, the integrated data store 40 needs to be updated as well. The integrated data store 40 may be periodically updated from the separate data stores, and the periods may differ between the data stores. For example, trouble tickets could be entered at any time, and the trouble ticket data store 42 might be checked every 15 minutes, whereas maintenance events may be scheduled in advance, and the maintenance data store 44 with their information may only be updated every 4 hours. Alternatively, in an embodiment, the integrated data store 40 may be updated on an event-driven basis, triggered by a change of information in the data stores 42, 44, 46, or 48.

In an embodiment, the method 200 further comprises accessing the integrated data store 40 via a web browser. The internal interface and the external customer portal may act as clients using a web browser to access the integrated data store 40 through server programs. Utilizing a web browser to access the integrated data store 40 would allow the use of a computer as a client without having to install a specific interface program. It would also allow access from any device with a web browser as long as the user has the appropriate login credentials, providing flexibility for the user when access to the integrated data store 40 is needed.

In an embodiment, the method 200 further comprises directing technical support processes based on an indication received in the filtered information. A technical support representative handling a customer call may retrieve the filtered information from the integrated data store 40 for the customers' network inventory items. The filtered information may contain indications of current activity on the customers' network inventory items, and these indications of current activity may be used by the technical support representative to decide on the direction to take in troubleshooting and resolving the customer inquiry. For example, a customer may call the network service provider to open a trouble ticket because their network access is unavailable. The technical support representative, upon accessing the customers' network inventory items from the integrated data store 40, sees an indication that maintenance is ongoing that is impacting the customers' network inventory items. Rather than opening a new trouble ticket, the technical support representative may inform the customer that the maintenance is occurring and that their service will be restored in the next hour. The technical support representative may also note the customer inquiry on the account and set a reminder to verify the status of the customers' network inventory items in one hour.

Figure 4:
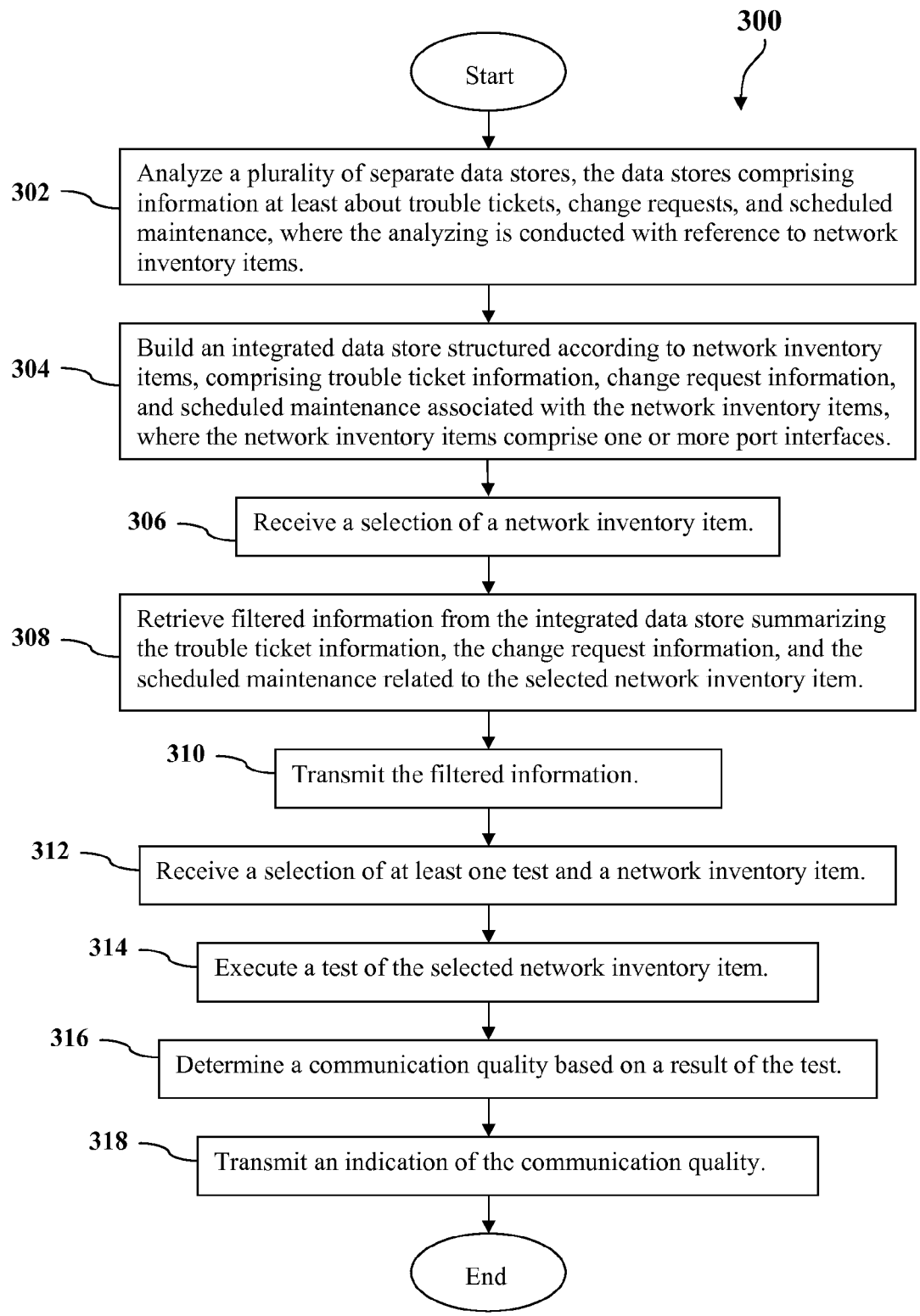
FIG. 4 is a flow chart of a method managing data communication network inventory according to an embodiment of the disclosure.

Turning now to FIG. 4, a method 300 of managing data communication network inventory is described. Steps 302 through 310 are substantially similar to steps 202 through 210 of method 200 described above with reference to FIG. 3. At block 312, a selection of at least one test and a network inventory item is received. The customer or technical support representative selects a network inventory item to test as well as one or more tests to run on the network inventory item. An example might include a ping test to check the port for packet loss or network latency. At block 314, a test of the selected network inventory item is executed. The selected tests are executed on the selected port. At block 316, a communication quality is determined based on a result of the test. The result of the selected tests is used to calculate a communication quality for the selected port. At block 318, an indication of the communication quality is transmitted. The indication of the communication quality is sent to the customer or technical support representative.

In an embodiment, the test is selected from the group consisting of a ping test, a packet error test, and a traffic prioritization test. The ping test verifies the network inventory item is available and responding to packets, and also measures the time from packet transmission to receipt. The packet error test measures the number of incorrectly received data packets divided by the total number of received packets. The traffic prioritization test verifies that the contracted traffic classifications and rates are enforced on packets from the network inventory item. In an embodiment, the test is executed automatically upon selecting the network inventory item. Upon selection of the network inventory item, a test is run to determine the current status of the network inventory item, without a separate selection of the test to be run. The test selection may be configurable and associated with the network inventory item, but run automatically when the network inventory item is selected to status update.

In an embodiment, the indication of communication quality comprises an indication of a loss of redundancy. The indication of a loss of redundancy may show an issue even while the network inventory item is functioning normally. In an embodiment, the communication quality comprises a variance of network quality based on the result of the test and the trouble ticket information and change request information associated with the network inventory item. The network quality may vary based on the result of the test. The communication quality is determined by the network quality combined with the trouble ticket information and change request information. The indication of communication quality may support these varying quality levels by presenting an easily interpreted indicator which can denote each level.

In an embodiment, the integrated data store 40 further comprises managed services information, premium services information, and telecommunication service priority code information associated with the network inventory items. The service provider may provide managed services such as network management and monitoring to the customer, and this information will be maintained in the integrated data store 40. The customer may also purchase premium services, for example direct interface to the network operations center of the service provider, with information being maintained in the integrated data store 40. Telecommunication service priority code denotes a port which has been flagged in accordance with US Federal Communication Commission mandates and this information is also maintained in the integrated data store 40.

In an embodiment, the information about managed services, premium services, and telecommunication service priority codes associated with the network inventory items are only available via an internal interface. This type of information is needed by technical support personnel to properly identify customer services equipped on the network inventory items and to efficiently address issues and identify appropriate troubleshooting procedures. Information about managed services, premium services, and telecommunication service priority codes associated with the network inventory items may be considered proprietary by the service provider and would not be presented through the external customer portal. For example, the customer may be on a hot list for the service provider to give more sensitive treatment due to previous issues, and while the service provider would maintain this information in the integrated data store 40, they may only want it presented over the internal interface to benefit technical support personnel.

Figure 5:
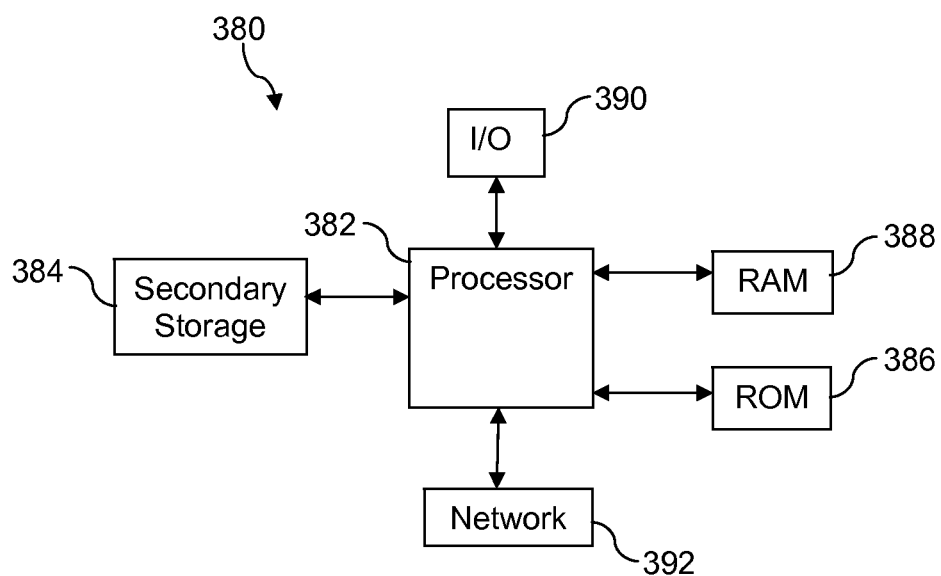
FIG. 5 illustrates an exemplary computer system according to an embodiment of the disclosure.

FIG. 5 illustrates a computer system 380 suitable for implementing one or more aspects of the embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method executed by at least one computing device for managing data communication network inventory, comprising:
    analyzing a plurality of separate data stores, each of the plurality of separate data stores storing information of a different type, wherein
        the different information types comprise at least trouble tickets, change requests, and scheduled maintenance,
        the analyzing is conducted with reference to a plurality of port interfaces on a plurality of routers in a data communication network,
        each router of the plurality of routers comprises at least two port interfaces, and
        at least one given port interface is shared by at least two of the plurality of routers;
    building an integrated data store structured according to the plurality of port interfaces based on the analyzing the plurality of separate data stores, wherein the integrated data store comprises
        trouble ticket information associated with the plurality of port interfaces,
        change request information associated with the plurality of port interfaces, and
        scheduled maintenance associated with the plurality of port interfaces;
    receiving, from a user, a selection of a port interface of the plurality of port interfaces;
    selecting a subset of information corresponding to the selected port interface from the integrated data store, wherein the selected subset of information summarizes the trouble ticket information, the change request information, and the scheduled maintenance related to the selected port interface; and
    transmitting the selected subset of information to the user for viewing.

2. The method of claim 1, wherein the integrated data store further comprises managed services information associated with the plurality of port interfaces.

3. The method of claim 2, wherein the integrated data store further comprises an indication of one or more port interfaces of the plurality of port interfaces managed by a third party vendor.

4. The method of claim 1, wherein the integrated data store further comprises premium services information associated with the plurality of port interfaces.

5. The method of claim 1, wherein the integrated data store further comprises telecommunication service priority codes information associated with the plurality of port interfaces.

6. The method of claim 1, wherein retrieving the selected subset of information from the integrated data store is based on whether the selection of the port interface is received via an internal interface or an external customer portal interface, and wherein the subset of information retrieved differs between the internal interface and the external customer portal interface.

7. The method of claim 6, wherein the subset of information retrieved from the integrated data store for the external customer portal interface is a subset of the subset of information retrieved for the internal interface.

8. The method of claim 6, wherein the plurality of port interfaces available in the external customer portal interface is based on a grouping of ports assigned to a customer login.

9. A method executed by at least a computing device for managing data communication network inventory, comprising:
    analyzing a plurality of separate data stores, each of the plurality of separate data stores storing information of a different type, wherein
        the different information types comprise at least trouble tickets, change requests, scheduled maintenance, current status information, and as-built network configuration information,
        the analyzing is conducted with reference to a plurality of port interfaces on a plurality of routers in a data communication network,
        each router of the plurality of routers comprises at least two port interfaces, and
        at least one given port interface is shared by at least two of the plurality of routers;
    building an integrated data store structured according to the plurality of port interfaces based on the analyzing the plurality of separate data stores, wherein the integrated data store comprises
        trouble ticket information associated with the plurality of port interfaces,
        change request information associated with the plurality of port interfaces,
        scheduled maintenance information associated with the plurality of port interfaces,
        current status information associated with the plurality of port interfaces, and
        as-built network configuration information associated with the plurality of port interfaces;
    receiving, from a user, a selection of a port interface of the plurality of port interfaces;
    selecting a subset of information corresponding to the selected port interface from the integrated data store, wherein the selected subset of information summarizes the trouble ticket information, the change request information, the scheduled maintenance, the current status, and the as-built network configuration related to the selected port interface; and
    transmitting the selected subset of information to the user for viewing.

10. The method of claim 9, wherein the scheduled maintenance associated with the plurality of port interfaces comprises customer specific, site specific, and port specific outage and maintenance information.

11. The method of claim 9, wherein the analyzing the plurality of separate data stores consists of correlating at least one identifier in one data store versus a different at least one identifier in another data store.

12. The method of claim 9, wherein the integrated data store is periodically updated with new data retrieved from the plurality of separate data stores.

13. The method of claim 9, further comprising directing technical support processes based on an indication received in the subset of information.

14. A method executed by at least a computing device for managing data communication network inventory, comprising:
   analyzing a plurality of separate data stores, each of the plurality of separate data stores storing information of a different type, wherein
      the different information types comprise at least about trouble tickets, change requests, and scheduled maintenance,
      the analyzing is conducted with reference to a plurality of port interfaces on a plurality of routers in a data communication network,
      each router of the plurality of routers comprises at least two port interfaces, and
      at least one port interface is shared by at least two of the plurality of routers;
   building an integrated data store structured according to the plurality of port interfaces based on h analyzing the plurality of separate data stores, wherein the integrated data store comprises
      trouble ticket information associated with the plurality of port interfaces,
      change request information associated with the plurality of port interfaces, and
      scheduled maintenance associated with the plurality of port interfaces;
   receiving, from a user, a selection of a port interface of the plurality of network inventory items;
   selecting a subset of information corresponding to the selected port interface from the integrated data store, wherein the selected subset of information summarizes the trouble ticket information, the change request information, and the scheduled maintenance related to the selected port interface;
   transmitting the selected subset of information to the user for viewing;
   receiving a selection of at least one test for the selected port interface;
   executing the selected at least one test of the selected port interface;
   determining a communication quality of the selected port interface based on a result of the selected at least one test; and
   transmitting an indication of the communication quality.

15. The method of claim 14, wherein the least one test is selected from the group consisting of a ping test, a packet error rate test, and a traffic prioritization test.

16. The method of claim 14, wherein the least one test is executed automatically upon selection.

17. The method of claim 14, wherein the indication of communication quality comprises an indication of a loss of redundancy.

18. The method of claim 14, wherein the communication quality comprises a variance of network quality based on the result of the least one test and the trouble ticket information and change request information associated with the selected port interface.

19. The method of claim 14, wherein the integrated data store further comprises managed services information, premium services information, and telecommunication service priority codes information associated with the plurality of port interfaces.

20. The method of claim 19, wherein the information about managed services, premium services, and telecommunication service priority codes associated with the plurality of port interfaces are only available via an internal interface.

* * * * *